United States Patent Office 3,152,161
Patented Oct. 6, 1964

3,152,161
N(BETA - HYDROXYETHYL - BETA - AMINO-ETHYL)-GAMMA - AMINOISOBUTYLMETH-YLSILOXY - MODIFIED DIMETHYLPOLY-SILOXANE
Robert J. Lisanke, Buffalo, and Roscoe A. Pike, Grand Island, N.Y., assignors to Union Carbide Corporation, a corporation of New York
No Drawing. Filed Aug. 18, 1960, Ser. No. 50,318
2 Claims. (Cl. 260—448.2)

This invention relates to organosilicon compounds. More particularly, the invention is directed to a novel class of N-(beta-hydroxyethyl-beta-aminoethyl)-gamma-aminoalkylsilicon compounds. These novel compounds include silanes, polysiloxane homopolymers and polysiloxane copolymers.

The silanes of this invention may be represented by the formula:

(A)

HOCH₂CH₂NHCH₂CH₂NHR'SiA₃₋ᵦ wherein R' is a saturated divalent hydrocarbon group, preferably one having the structure —CH₂CH₂CH₂— or —CH₂CH(CH₃)CH₂—, R is a monovalent hydrocarbon group free from aliphatic unsaturation, preferably one containing from one to ten carbon atoms, A is an alkoxy group, preferably an alkoxy group containing from one to eight carbon atoms, b is an integer having a value from zero to one, and the nitrogen atom attached to the R' group is removed from the silicon atom by at least three carbon atoms.

Illustrative of the silanes represented by Formula A are the following:

N-(beta-hydroxyethyl-beta-aminoethyl)-gamma-aminoisobutyltriethoxysilane,
N-(beta-hydroxyethyl-beta-aminoethyl)-gamma-aminopropylmethyldiethoxysilane,
N-(beta-hydroxyethyl-beta-aminoethyl)-gamma-aminoisobutylmethyldiethoxysilane,
N-(beta-hydroxyethyl-beta-aminoethyl)-gamma-aminoisobutylphenylethoxymethoxysilane,
N-(beta-hydroxyethyl-beta-aminoethyl)-gamma-aminopropylethyldibutoxysilane,
N-(beta-hydroxyethyl-beta-aminoethyl)-gamma-aminopropyltrioctoxysilane,
N-(beta-hydroxyethyl-beta-aminoethyl)-gamma-aminoisobutylmethyldiheptoxysilane,
N-(beta-hydroxyethyl-beta-aminoethyl)-gamma-aminoisobutyloctyldiethoxysilane,
N-(beta-hydroxyethyl-beta-aminoethyl)-gamma-aminoisobutyl(p-n-butylphenyl)dimethoxysilane,
N-(beta-hydroxyethyl-beta-aminoethyl)-gamma-aminopropyl(gamma-phenylpropyl)diethoxysilane,
N-(beta-hydroxyethyl-beta-aminoethyl)-gamma-aminoisobutylnaphthyldiethoxysilane, and
N-(beta-hydroxyethyl-beta-aminoethyl)-gamma-aminoisobutyl(cyclohexyl)-diethoxysilane.

The polysiloxanes of the present invention can be cyclic or non-cyclic and contain the structural unit (B)
$$\left[ \text{HOCH}_2\text{CH}_2\text{NHCH}_2\text{CH}_2\text{NHR'SiO}_{\frac{3-b}{2}} \right]$$

wherein R', R and b have the meanings defined hereinabove. Illustrative of the polysiloxane units represented by formula B are units derived from the silanes listed in the preceding paragraph as, for example, the

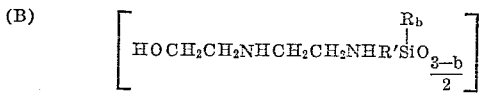
HOCH₂CH₂NHCH₂CH₂NHCH₂CH₂CH₂Si—O unit derived from N-(beta-hydroxyethyl-beta-aminoethyl)-gamma-aminopropylmethyldiethoxysilane.

In addition to units of Formula B, the polysiloxanes of the present invention can also contain units represented by the formula (C)
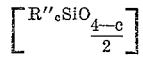
$$\left[ R''_cSiO_{\frac{4-c}{2}} \right]$$

wherein R'' is a monovalent hydrocarbon group free from aliphatic unsaturation, preferably one containing from one to ten carbon atoms and c is an integer having a value from 1 to 3. Illustrative of the R'' groups are the following: methyl, ethyl, propyl, isobutyl, hexyl, 2-ethylhexyl, octyl, phenyl, naphthyl, tetrahydronaphthyl, beta-phenylethyl, gamma-phenyl-propyl, p-xylyl, p-n-butylphenyl, p-isopropylphenyl, cyclopentyl and cyclohexyl.

The following typical polysiloxanes further illustrate the compounds of the present invention. In these formulas C₃H₆ represents —CH₂CH₂CH₂—, C₄H₈ represents

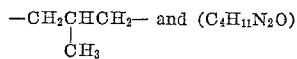
—CH₂CHCH₂— and (C₄H₁₁N₂O)
     |
     CH₃ represents

HOCH₂CH₂NHCH₂CH₂NH—:

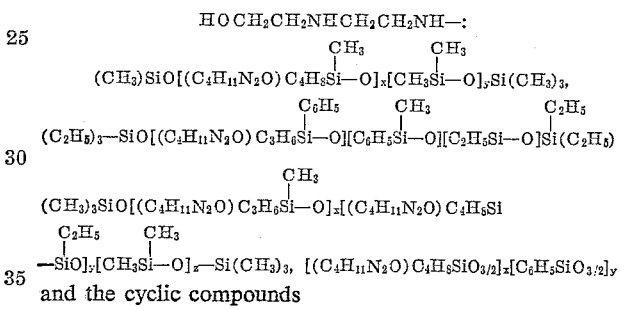

(CH₃)SiO[(C₄H₁₁N₂O)C₄H₈Si—O]ₓ[CH₃Si—O]ᵧSi(CH₃)₃,
         |              |
         CH₃            CH₃

(C₂H₅)₃—SiO[(C₄H₁₁N₂O)C₃H₆Si—O][C₆H₅Si—O][C₂H₅Si—O]Si(C₂H₅)
         |                    |              |
         C₆H₅                 CH₃            C₂H₅

(CH₃)₃SiO[(C₄H₁₁N₂O)C₃H₆Si—O]ₓ[(C₄H₁₁N₂O)C₄H₈Si
         |
         CH₃
    C₂H₅   CH₃
     |      |
—SiO]₂[CH₃Si—O]ₓ—Si(CH₃)₃, [(C₄H₁₁N₂O)C₄H₈SiO₃/₂]ₓ[C₆H₅SiO₃/₂]ᵧ
and the cyclic compounds

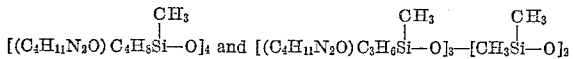
        CH₃                      CH₃      CH₃
         |                        |        |
[(C₄H₁₁N₂O)C₄H₈Si—O]₄ and [(C₄H₁₁N₂O)C₃H₆Si—O]₃—[CH₃Si—O]₃

In the above examples x, y and z are integers having values of from 1 to about 100.

The silanes of this invention which are represented by formula A, may be prepared by the reaction of a chloroalkylalkoxysilane represented by the formula (D)
      Rᵦ
       |
    ClR'SiA₃₋ᵦ wherein R', R, A and b have the meanings defined above with reference to Formula A, with beta-hydroxyethyl-ethylenediamine, HOCH₂CH₂NHCH₂CH₂NH₂. The polysiloxanes of this invention can be prepared by the reaction of beta-hydroxyethylethylenediamine with (1) a polysiloxane containing units represented by the formula (E)
$$\left[ \text{ClR'SiO}_{\frac{3-b}{2}} \right]$$

wherein R', R and b have the meanings defined above with reference to Formulas A and B or with (2) a polysiloxane containing both units represented by formula E and units represented by Formula C. A preferred method for carrying out these reactions is described in more detail below.

The polysiloxanes of this invention can also be prepared according to conventional procedures by the hydrolysis of the silanes of Formula A or by the equilibration of compounds containing units of Formulas B and C.

The chloroalkylalkoxysilanes of Formula D can be prepared by reacting the corresponding chloroalkyl-chlorosilanes with an alcohol according to conventional procedures. The chloroalkylchlorosilanes can in turn be prepared by contacting a chloroaliphatic compound containing a double bond with a chlorosilane having the formula

$$HSiCl_{3-b}$$

wherein R and $b$ have the meanings defined hereinabove with reference to Formula A, in the presence of a platinum catalyst. For example, using a platinum or gamma-alumina catalyst in each instance, allylchloride reacts with trichlorosilane to produce gamma-chloropropyltrichlorosilane and methallyl chloride reacts with phenyldichlorosilane to produce gamma-chloroisobutylphenyldichlorosilane. This method of producing chloroalkylchlorosilanes, which in turn can be converted to chloroalkyl-alkoxysilanes is further illustrated by the following example:

Into a one-liter, three-necked flask equipped with reflux condenser, mechanical stirrer and dropping funnel were charged 115 grams (1 mole) of $CH_3SiHCl_2$, 200 cc. of trichloroethylene and 4.1 grams platinum-on-gamma-alumina catalyst (2 parts by weight platinum per 100 parts by weight of gamma-alumina). The mixture was heated with stirring until the $CH_3SiHCl_2$ started to reflux (40° C. to 45° C.) and 90.5 grams (1 mole) of methallyl chloride was then added by means of the dropping funnel in small increments over a two and one-half hour period. The reaction was very exothermic. After the addition was complete the mixture was heated at 80° C. for an additional hour. The mixture was then cooled, filtered to remove the catalyst, and the solvent was evaporated from the filtarate under reduced pressure. The residue was fractionated through a glass-helix packed column under reduced pressure to give 163 grams (80 mole percent yield) of $ClCH_2CH(CH_3)CH_2Si(CH_3)Cl_2$.

The chloroalkyl polysiloxanes containing units of Formula E or units of both Formula E and Formula C can be prepared by conventional methods such as hydrolysis of the monomeric silanes of Formula D or by equilibration of compounds containing units of Formulas D and C. An example illustrating the preparation of chloroalkyl-containing polysiloxanes is included in the detailed examples presented hereinbelow.

A preferred process for producing the compounds of the present invention comprises contacting under essentially anhydrous conditions beta-hydroxyethylethylenediamine with a chloroalkyl silicon compound of the class described above with reference to Formulas D and E. At least three moles of beta-hydroxyethylethylenediamine per mole of chloroalkyl unit should be employed.

The process for producing the compounds of this invention may be carried out at atmospheric pressure or under pressure in a suitable pressure vessel such as an autoclave. When the process is carried out by heating the reactants in a pressure vessel, autogenous pressure can be employed or the vessel can be pressurized prior to heating with an inert gas such ar argon, nitrogen or helium.

As pointed out hereinabove the diamine reactant is employed in stoichiometric excess and there should be present in the reaction mixture at least a three-to-one mole ratio of diamine to each chloroalkyl group in the organosilicon compound. The use of excess diamine solubilizes the amine hydrochloride formed in the reaction. Thus, the reaction mixture comprises only one or more liquid phases and no solid phase is present to interfere with separation and recovery of the desired reaction product. The excess of the beta-hydroxyethylethylenediamine also reduces the formation of bis compounds, such as

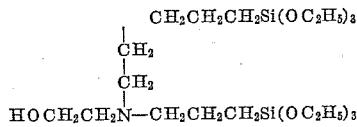

as a side reaction. This is particularly important when the chloroalkylsilicon compound is a polysiloxane, where bis compound formation causes cross-linking and gum formation in the product polysiloxane.

The preferred mole ratio of diamino compound to chloroalkyl compound is from about four-to-one to about six-to-one. Mole ratios of ten-to-one or higher are operable but no particular advantage is gained by employing mole ratios in excess of the four-to-one to six-to-one range.

The process may be carried out with or without the use of a solvent. When the chloroalkyl silicon compound is a silane or a copolymer containing units of both Formula E and Formula C there is no advantage to be gained from the use of a solvent. When the chloroalkyl silicon compound is a homopolysiloxane containing (with the exception of end-blocking groups) only units of Formula E, it is preferable to add a solvent to the chloroalkyl silicon compound-diamine mixture. If a solvent is not employed in this instance it has been found that the amine hydrochloride formed in the reaction is partly soluble in the N-(beta-hydroxyethyl-beta-aminoethyl)-gamma-aminoalkyl polysiloxane product. The dissolved amine hydrochloride must then be removed from the product by the addition of a solvent and it is, therefore, more convenient to employ the solvent in the starting reaction mixture. Also, in the absence of a solvent, the chloroalkyl homopolymer can undergo further polymerization at elevated temperatures to give high molecular weight gums. The gum may be, of course, depolymerized by heating in a solvent but again it is more convenient to use the solvent in the starting reaction mixture and thus eliminate gum formation due to the further polymerization of the polysiloxane. The choice of solvent is not critical and any liquid organic solvent conventionally employed in reactions involving organosilicon compounds can be used. Examples of suitable solvents are aliphatic hydrocarbons such as hexane, heptane and petroleum ether, alcohols such as ethanol, butanol and 2-ethylhexanol and aromatic hydrocarbons such as benzene, toluene and xylene.

The amount of solvent is not critical. The amount can vary from 10 to 80 volume percent of the total reaction mixture. It has been found that from about 20 to about 50 volume percent of solvent is preferred if a solvent is used at all.

The reaction temperature and the duration of the reaction can vary over wide limits. In general, temperatures in the range from 50° C. to 300° C. are employed with times ranging from one hour to twenty-four hours. At lower temperatures the reaction proceeds slowly and at higher temperatures the yield can be reduced due to decomposition of the silanes or gum formations in the polysiloxanes. The preferred conditions when carrying out the reaction in a pressure vessel were found to be from 160° C. to 190° C. for three to seven hours. When carrying out the reaction at atmospheric pressure, the preferred conditions are the atmospheric boiling temperature (reflux temperature) of the reaction mixture for from three to seven hours. If the reflux temperature is below 50° C. a pressure vessel can be used to obtain higher temperatures and if the reflux temperature is above 300° C. the reaction mixture is not heated to its boiling point.

In order to obtain high yields by the process described above, it is necessary that the reaction be carried out under anhydrous conditions. The primary potential source of undesirable water is the beta-hydroxyethylethylenediamine. Consequently, the diamine should be carefully dried before use. This may be done conveniently by distillation or by employing a suitable drying agent. It has been found that if the amount of water in the system exceeds about 2 weight percent based on the amount of diamine, gelation of the reaction mixture occurs and that the yield of N-(beta-hydroxyethyl-beta-aminoethyl)-gamma-aminoalkyl compound is seriously reduced. Although most of the water can be eliminated by careful drying of the diamine, it is also preferable to carry out the reaction in a pressure vessel or under an inert atmosphere if the reaction is done at atmospheric pressure.

Typical examples of the process for producing the compounds of the present invention are the following (wherein $C_4H_{12}N_2O$ represents beta-hydroxyethylethylenediamine): The reaction of gamma-chloroisobutylmethyldiethoxysilane with $C_4H_{12}N_2O$ to give N-(beta-hydroxyethyl-beta-aminoethyl) - gamma - aminopropylmethyldiethoxysilane, the reaction of $C_4H_{12}N_2O$ with gamma-chloroisobutylphenyldimethoxysilane to give N-(beta-hydroxyethyl-beta-aminoethyl) - gamma - aminoisobutylphenyldimethoxysilane, the reaction of gamma-chloropropylcyclohexyldiheptoxysilane with $C_4H_{12}N_2O$ to give N-(beta-hydroxyethyl-beta-aminoethyl) - gamma - aminopropylcyclohexyldiheptoxysilane, the reaction of $C_4H_{12}N_2O$ with gamma-chloropropylmethylpolysiloxane cyclic tetramer in toluene solvent to give N-(beta-hydroxyethyl-beta-aminoethyl)-gamma-aminopropylmethylpolysiloxane cyclic tetramer, and the reaction of trimethylsiloxy end-blocked gamma-chloropropyl-p-tolyl polysiloxane with $C_4H_{12}N_2O$ in butanol solvent to give trimethylsiloxy end-blocked gamma-aminopropyl-p-tolyl polysiloxane. All of these reactions are carried out under anhydrous conditions using at least three moles of $C_4H_{12}N_2O$ per mole of chloroalkyl group in the chloroalkyl silicon compound.

The compounds of this invention, including silanes, polysiloxane homopolymers and polysiloxane copolymers, are useful as pigment binders for coloring fiber glass substrate materials, particularly fiber glass cloth. For use as pigment binders, an aqueous solution is prepared containing an N-(beta-hydroxyethyl-beta - aminoethyl) - gamma-aminoalkyl silicon compound of this invention and a water-soluble organic monocarboxylic acid, such as formic, acetic and propionic acids, to solubilize the silicon compound. A suitable pigment is then dispersed in this solution by conventional methods. The fiber glass cloth is then treated with this pigment-containing dispersion and passed through a padder roll which controls the amount of dispersion retained by the cloth. The cloth is then heat-cured by conventional procedures to produce a colored fiber glass cloth which retains its color after washing in aqueous soap solution.

Operable pigments include both natural and synthetic inorganic pigments of the types of umber, sienna, ochre, aluminum, and the like, and chrome greens, iron blues, iron oxide browns and reds, zinc whites, titanium whites, ultramarine blue, lead chromate yellows, zinc chromate yellows, cadmium reds, carbon blacks, and the like; and natural and synthetic organic pigments of the types of carmine, catechu, tumeric, fustic, logwood, and the like, and naphthol yellows, azo reds, lithol reds, azo oranges, indanthrene blues, indanthrene violets, toluidene yellows, phthalocyanine blues, and the like.

Specific examples of operable pigments are the following commercially available pigment formulations:

Microfix Brilliant Green G
Microfix Brilliant Blue 4G
Microfix Red R
Harshaw Permanent Carmine W–3160
Harshaw Phthalocyanine Blue W–4121
Imperse Marcy Red X–2622
Imperse Yellow B X–2453
Imperse Green X–2454
Imperse Blue Z–2446.

In the detailed illustrative examples presented hereinbelow, the following abbreviations are used:

Cp.=centipoise
N.E.=neutralization equivalent, a measure of titratable amine in the aminoalkyl-silicon compound
G.=gram
Ml.=milliliter
$n_D^{25}$=refractive index at 25° C. of light having the wave length of the sodium "D" line P.s.i.g.=pounds per square inch gauge
Mm. Hg=millimeters of mercury

EXAMPLE 1

*Reaction of Gamma-Chloroisobutyltriethoxysilane With Beta-Hydroxyethylethylenediamine*

Into a 300 milliliter pressure vessel was charged 63.5 grams (0.25 mole) of gamma-chloroisobutyltriethoxysilane and 104 grams (1 mole) of dry beta-hydroxyethylenediamine. The compounds were not miscible. The vessel was sealed and heated in a rocking furnace for four hours at 180° C. The vessel was cooled and discharged to give a straw-yellow homogeneous viscous liquid. The product was extracted with two 200 milliliter portions of benzene. The benzene extracts were combined and concentrated by bubbling nitrogen through the solution while heating to 150° C. followed by heating to 150° C. under 2.0 mm. Hg vacuum. The product, a pale yellow viscous oil, amounted to 63 grams, 78 weight percent of theory.

The product $HOCH_2CH_2NHCH_2CH_2NHCH_2$

was partially soluble in water. In dilute acetic acid it rapidly dissolved to give a clear solution.

Titration for neutralization equivalent with 0.1 N hydrochloric acid gave the following results: Found: 169.5. Theory: 161.

EXAMPLE 2

*Preparation of the Starting Material for the Reaction of Example 3*

Two gamma-chloroisobutylmethylsiloxy modified dimethyl polysiloxane oils, namely, (1) 48.2 weight percent Modifying Group (3000 M.W.) and (2) 44.5 weight percent Modifying Group (5000 M.W.) were prepared. The method for preparing the 44.5 weight percent modified (5000 M.W.) dimethyl polysiloxane oil is described in detail. The 48.2 weight percent modified (3000 M.W.) dimethyl polysiloxane oil was used in the experiment described in Example 3 below.

A three-liter three-necked flask equipped with stirrer, reflux condenser and addition funnel was charged with water (435 grams, 24.3 moles) and ferric chloride tetrahydrate (4.9 grams, 0.15 weight percent of silicone). Gamma-chloroisobutylmethyldichlorosilane (852 grams, 4.1 moles) and dimethyldichlorosilane (1010 grams, 7.8 moles) were combined in a separate flask and about 80 percent by volume of the chlorosilane mixture was added rapidly to the water-ferric chloride mixture over one and one-half hours. The remaining 20 percent of the chlorosilane mixture was diluted with trimethylchlorosilane (47.8 grams, 0.44 mole) and the mixture added to the pot over one-half hour. The temperature of the reaction vessel rose on the addition of the premixed chlorosilanes to about 95° C., when about one-third by volume had been added. Further addition was accompanied by a temperature drop to about 5° C. with copious evolution of hydrogen chloride. (During the addition of chlorosilanes, great care was exercised to maintain a constant slow agitation from the stirring motor. It was observed that the mixture foamed badly with very rapid stirring.) The mixture was stirred an additional hour and allowed to warm up to room temperature. Two phases separated. The upper product oil phase was washed with water (100 milliliters) twice after dilution with toluene (100 milliliters). A stabilizer, calcium oxide (2 grams) was added to the first water wash. The washed wet oil was dried in vacuo at 15 mm. Hg to 60° C. over one-half hour and then further at 3.3 mm. Hg to 80° C. over one-half hour. The product oil [1203 grams, $n_D^{25}$ 1.4364, viscosity (25° C.) 63 cps.] containing 44.5 weight percent gamma-chloroisobutylmethylsiloxy units was obtained in 96 mole percent yield.

*Analysis.*—Calculated for:

$(CH_3)_3SiO[ClC_4H_8Si(CH_3)O]_{12}[(CH_3)_2SiO]_{28}Si(CH_3)_3$:

Cl, 10.5. Found: Product Oil: Cl, 10.5.

EXAMPLE 3

*Reaction of Gamma-Chloroisobutylmethylsiloxy (48.2 wt. Percent) Modified Dimethyl Polysiloxane Oil With Beta-Hydroxyethylethylenediamine*

In a 300 milliliter autoclave, a mixture of (48.2 weight percent) gamma-chloroisobutylmethylsiloxy modified dimethyl polysiloxane oil (85 grams, 0.272 mole) and beta-hydroxyethylethylenediamine [115 grams, 1.10 moles (4.05 moles of diamine per mole halogen)] was formed. The vessel was pressurized with argon to 100 p.s.i.g. and heated for three hours at 170° C. The vessel was then cooled under cold water to 25° C. and vented to the atmosphere. After removal of the reaction mixture the autoclave was washed with toluene three times (33 milliliters) and the washings combined with the product. The mixture separated into three phases: Upper phase, primarily toluene-soluble material, 145 grams; middle oil phase, 22 grams; and lower salt phase, 111 grams. Titration of the lower salt phase indicated a 37 mole percent conversion of halogen to ionic chloride. The upper and middle phases were combined and dry methanol (100 milliliters) was added. The methanol was added to aid in the separation of the aminoalkyl polysiloxane from the unreacted chloroalkyl polysiloxane, the latter observed to be insoluble in methanol. Two phases separated: The upper phase was an amino polysiloxane-methanol mixture and the lower phase was mostly chloroalkyl polysiloxane. The upper amine phase was evaporated to dryness at 15 mm. Hg to 80° C. over one hour and then further dried at 1 mm. Hg to 70° C. for one hour. A clear oil [26 grams, $n_D^{25}$ 1.4636] containing 86.3 weight percent N-(beta-hydroxyethyl-beta-aminoethyl)-gamma-aminoisobutylmethylsiloxy units was isolated in 38 mole percent conversion as a copolymer from the starting chloroalkyl polysiloxane oil. The methanol insoluble oil (55 grams, $n_D^{25}$ 1.4320) accounted for the remainder of the starting polysiloxane.

*Analysis.*—Calculated for:

$[HOC_2H_4NHC_2H_4NHC_4H_8Si(CH_3)O]_3[(CH_3)_2SiO]$:

N.E. 121. Found: N.E. 126.

EXAMPLE 4

The polysiloxane produced in accordance with Example 3 was used as a pigment binder for fiber glass cloth. Coloring baths having the following composition were prepared:

| | Wt.-Percent |
|---|---|
| Dimethylsiloxane copolymer containing 86.3 weight percent [HOC₂H₄NHC₂H₄NHCH₂CH(CH₃)CH₂Si(CH₃)O] | 2.89 |
| Acetic acid (glacial) | 5.0 |
| Pigment paste | 2.0 |
| Water | 90.11 |

Two different pigment pastes were employed, one containing a blue pigment and one a red pigment. The pigment pastes were obtained from Harshaw Chemical Company and were identified as "Permanent Carmine W–3160" and "Phthalocyanine Blue W–4121". Samples of fiber glass cloth were immersed in the coloring baths and were then passed through padder rolls set so that the cloth retained 20 weight percent of the coloring composition. The samples were then heat-cured for three minutes at 400° F.

Five-inch square samples of the heat-cured colored cloth were then washed for five minutes in solutions comprising 250 milliliters of water and 0.5 weight percent soap at a temperature of about 50° C. The samples showed good retention of color after the wash tests.

Similar good color retention is obtained when the fiber glass cloth which has been immersed in the coloring bath and passed through the padder rolls is heat-cured (that is, the silicon compound pigment binder is fixed or bonded to the fiber glass cloth substrate by the application of heat) at temperatures in the range from about 200° F. to about 400° F.

What is claimed is:

1. An N-(beta-hydroxyethyl-beta-aminoethyl)-gamma-aminoisobutylmethylsiloxy-modified dimethyl polysiloxane.

2. An N-(beta-hydroxyethyl-beta-aminoethyl)-gamma-aminoisobutylmethylsiloxy-modified dimethyl polysiloxane containing about 86 weight percent N-(beta-hydroxyethyl-beta-aminoethyl)-gamma-aminoisobutylmethylsiloxy units.

References Cited in the file of this patent

UNITED STATES PATENTS

| 2,563,288 | Steinman | Aug. 7, 1951 |
| 2,715,133 | Speier | Aug. 9, 1955 |
| 2,754,311 | Elliott | July 10, 1956 |
| 2,762,823 | Speier | Sept. 11, 1956 |
| 2,934,459 | Canovai | Apr. 26, 1960 |
| 2,971,864 | Speier | Feb. 14, 1961 |
| 3,046,295 | Lisanke et al. | July 24, 1962 |

FOREIGN PATENTS

| 1,230,820 | France | Apr. 4, 1960 |